Figure 1:
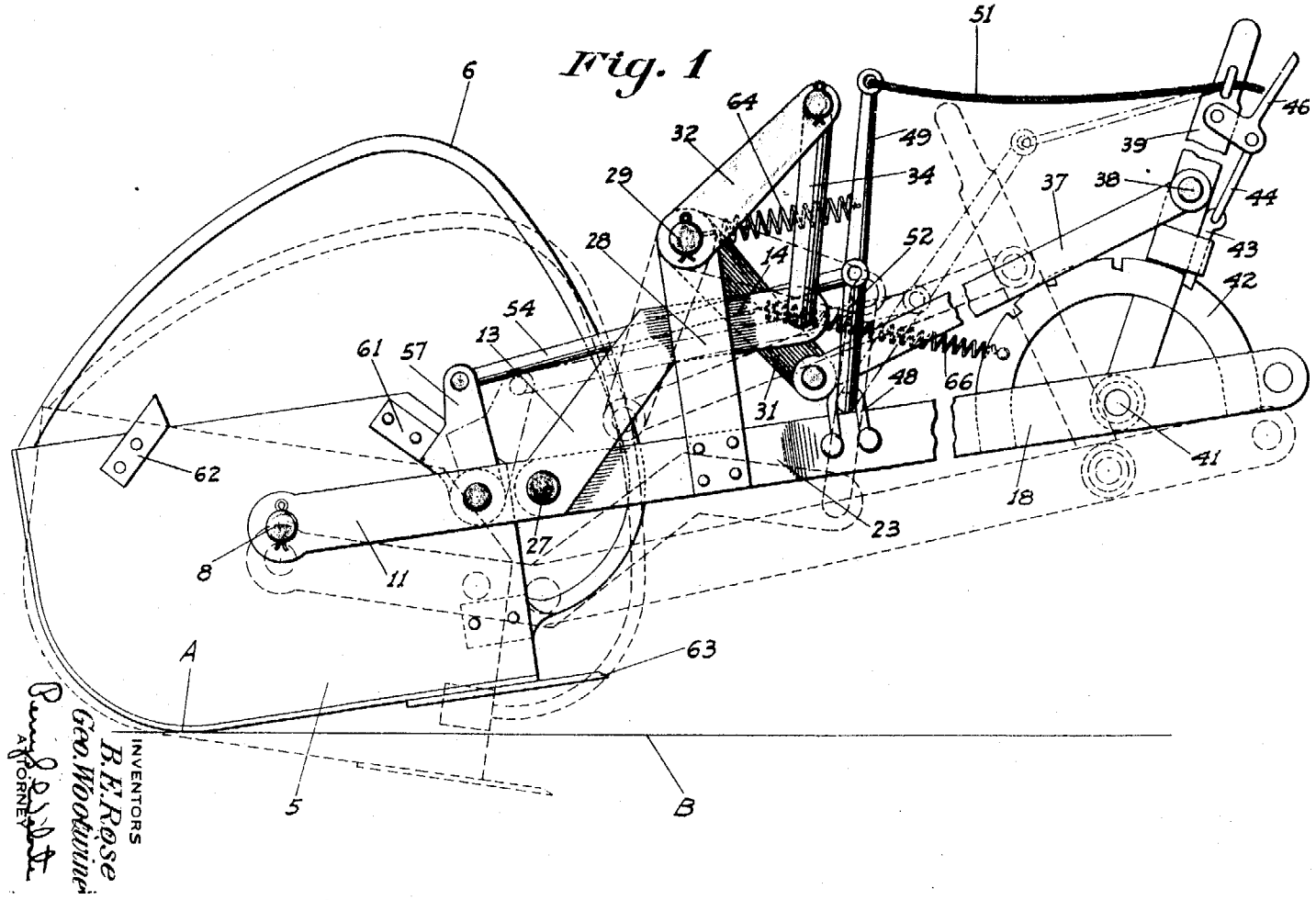

BEST AVAILABLE COPY

July 17, 1928.

Re. 17,044

B. E. ROSE ET AL

SCRAPER

Original Filed April 7, 1922 2 Sheets-Sheet 1

INVENTORS
B. E. Rose
Geo. Wootwine
Perry L. White
ATTORNEY

July 17, 1928.
Re. 17,044
B. E. ROSE ET AL
SCRAPER
Original Filed April 7, 1922 2 Sheets-Sheet 2
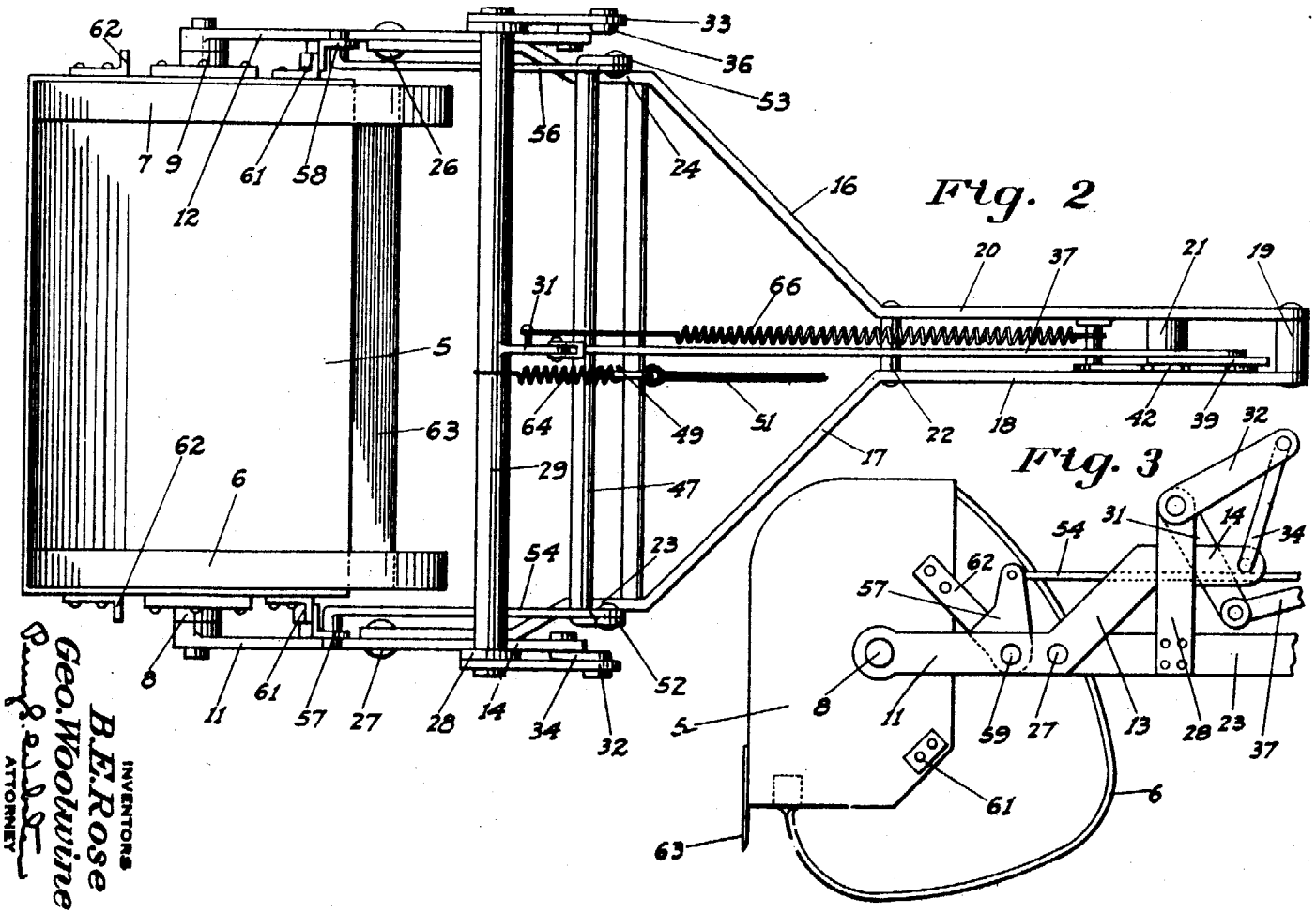
INVENTORS
B.E.Rose
Geo.Woolwine
ATTORNEY

37- EXCAVATING.

140

Reissued July 17, 1928. Re. 17,044

UNITED STATES PATENT OFFICE

BRUCE E. ROSE, OF STOCKTON, AND GEORGE WOOLWINE, OF EMPIRE, CALIFORNIA.

SCRAPER.

Original No. 1,460,340, dated June 26, 1923, Serial No. 550,382, filed April 7, 1922. Application for reissue filed July 19, 1926. Serial No. 123,494.

This invention relates to improvements in scrapers and particularly to that type of scraper used in the leveling of land where the soil is to be cut away, transported and dumped.

The principal object of this invention is to produce a scraper which may be drawn behind a tractor or in any other convenient manner and one which will be simple to operate.

Another object is to devise hinged means whereby the action of drawing the scraper will assist in raising the loaded scraper into transporting position.

Another object is to provide simple means for dumping and leveling.

Another object is to provide a scraper which is simple in construction and consequently cheap to manufacture.

Other objects and advantages will be apparent during the course of the following description.

In the accompanying drawings forming a part of this specification, and in which like numerals are employed to designate like parts throughout the same, Fig. 1 is a side elevation of our scraper in transporting position, Fig. 2 is a top plan view of Figure 1, and Fig. 3 is a side elevation of the scraper in dumping and leveling position.

In the accompanying drawings wherein for the purpose of illustration is shown a preferred embodiment of our invention, the numeral 5 designates a scoop of the usual construction which is provided with skids 6 and 7. Secured to the sides of the scoop 5 are trunnions 8 and 9. These trunnions have mounted thereon forwardly projecting drawbars 11 and 12. By referring to Figures 1 and 3 it will be noted that these draw bars are each provided with an upwardly inclined portion 13 and are further each provided with a forward projecting portion 14. The numerals 16 and 17 refer to diverging draft members which are bent so as to be parallel as shown at 18 and 20, and are secured together as by spacers 19, 21 and 22. Projecting rearwardly from the portions 16 and 17 are parallel portions 23 and 24. The ends of these parallel portions 23 and 24 are pivoted as at 26 and 27 to the draw bars 11 and 12. A standard 28 is provided upon each of the portions 23 and 24 as best shown in Figures 1 and 3. These standards in turn support a cross bar 29 having a downwardly extending arm 31 integral therewith and provided at its ends with levers 32 and 33. These levers 32 and 33 each carry a link as shown at 34 and 36 which are connected at their free ends to the portions 14 of the draw bars. A link 37 is connected to the arm 31 and extends forwardly and is pivoted at 38 to a lever 39 pivoted at 41 on the spacer 21. This lever 39 is of the usual hand type and is adapted to move over a segment 42 and to be held in engagement therewith as by a latch 43 operated through the medium of a link 44 and a grip handle 46. At 47 we have shown a rod extending between the portions 23 and 24 and secured thereon as by U shaped members 48. This rod has an integral upstanding arm 49 to which a rope 51 is adapted to be attached and has its free end secured to the hand lever 39. This rod 47 is provided with upstanding end portions 52 and 53 to which links 54 and 56 are secured. These links extend rearwardly and are each pivoted to a dog as shown at 57 and 58. These dogs are in turn pivoted to the draw bars 11 and 12 as at 59 and are adapted to lie within the path of lugs 61 and 62 secured to the sides of the scoop 5. The usual digging tooth 63 is secured to the bottom of the scoop as shown in Figures 1 and 3. A spring 64 is provided to maintain the lever 49 in its upright position and a spring 66 is provided to assist in the raising of the scoop from its digging to its transporting position.

The operation of our device is as follows:

Fig. 1, as already indicated, shows the position of the parts when the scraper is out of loading position and in transporting position. In this position the scoop 5 rests on the ground at a point A near the rear of the scoop and the bottom of the scoop inclines upward from the point A at an acute angle to the ground level B but substantially parallel to the draw bars and draft members when they are alined for the straight pull. Thus the point A is the pivot point for the scoop as it is lowered into loading position or lifted from a loading position, as will be now described in detail.

Assuming then that the parts are in the position shown in Figure 1 and it is desired to cause the scoop to engage the ground and fill, the lever 39 and handle 46 are grasped raising the latch 43 after which the lever 39 may be moved rearwardly and into its dotted line position. This rearward movement causes the arm 31 to move rearwardly consequently throwing the lever 32, and link 34 downwardly. This downward movement will cause the portion 14 of the draw bar 11 to move nearer the ground thereby destroying the straight line pull from the tractor or other drawing power and allowing the scoop 5 to pivot on the point A. This downward movement will throw the parts into their dotted line positions after which forward movement of the scoop will cause the same to fill.

During the filling operation the latch 43 may be set at a predetermined notch in the segment 42 so that the connections between the lever 39 and the draw bars 11—12 will positively hold the scoop in filling position until the movement of the lever is reversed.

After the scoop has become filled, by pushing forwardly on the lever 39 the parts will be restored to their full line position, pivoting the scoop 5 on the point A to raise it to its normal transporting position, as shown in Fig. 1. This raising action will be assisted by the tendency of the draw bars 11—12 and the draft means to return to a straight line draft through the hinged connections 26 and 27 and will be further assisted by the action of the spring 66. When the load has been transported and it is desired to spread same, the rope 51 is given a pull causing tension of the spring 64 which draws the dogs 57 out of contact with the lugs 61 and the scoop will then move to the position shown in Figure 3 and as the spring 64 has returned the lever 49 to its full line position the dogs 57 will be in position to contact with the lugs 62 as shown in Figure 3, this being the dumping and spreading position of the scoop.

It is to be understood that the form of our invention herewith shown and described is to be taken as a preferred example of the same, and that various changes in the shape, size and arrangement of parts may be resorted to without departing from the spirit of the invention or the scope of the subjoined claims.

Having thus described our invention, we claim.

1. In a device of the character described, a scoop, draw bars pivoted to said scoop, said draw bars having offset portions, draft means pivoted to said draw bars at a point substantially midway of their length, said draft means comprising parallel spaced portions provided with offsets therein, standards secured to said draft means, a segment secured to said draft means, a lever pivoted to said draft means and adapted to move over said segment, a bar extending between said standards, levers mounted on the ends of said bar, links extending from said levers to the free ends of said draw bars and means for rotating said bar through the movement of said first mentioned lever for the purpose of moving the free ends of said draw bars toward said draft means.

2. In a device of the character described, a scoop, draw bars pivoted to said scoop, said draw bars having offset portions, draft means pivoted to said draw bars at a point substantially midway of their length, said draft means comprising parallel spaced portions provided with offsets therein, standards secured to said draft means, a segment secured to said draft means, a lever pivoted to said draft means and adapted to move over said segment, a bar extending between said standards, levers mounted on the ends of said bar, links extending from said levers to the free ends of said draw bars and means for rotating said bar through the movement of said first mentioned lever for the purpose of moving the free ends of said draws bars toward said draft means, a rod supported on said draft means, said rod having upturned ends, a lever integral with said rod and extending upwardly therefrom, dogs mounted on said draw bars, links connecting the upturned ends of said rods with said dogs, and lugs mounted on said scoop and adapted to contact with said dogs.

In testimony whereof we affix our signatures.

BRUCE E. ROSE.
GEORGE WOOLWINE.